(12) United States Patent
Deng et al.

(10) Patent No.: US 7,836,150 B2
(45) Date of Patent: Nov. 16, 2010

(54) POINT-TO-POINT COMMUNICATION USING UPNP PROTOCOL

(75) Inventors: Hui Deng, San Ramon, CA (US); JianMing Tu, Shanghai (CN); Mingxia Xin, Shanghai (CN)

(73) Assignee: ArcSoft (Shanghai) Technology Company, Ltd, Shanghai (CN)

( * ) Notice: Subject to any disclaimer, the term of this patent is extended or adjusted under 35 U.S.C. 154(b) by 756 days.

(21) Appl. No.: 11/618,737

(22) Filed: Dec. 30, 2006

(65) Prior Publication Data

US 2008/0159265 A1   Jul. 3, 2008

(51) Int. Cl.
G06F 15/16 (2006.01)

(52) U.S. Cl. .................... 709/218; 709/227; 370/352

(58) Field of Classification Search .......... 709/228, 709/200–227; 370/352
See application file for complete search history.

(56) References Cited

U.S. PATENT DOCUMENTS

| | | | |
|---|---|---|---|
| 6,856,617 B2 * | 2/2005 | Lee et al. | 370/352 |
| 7,031,747 B2 * | 4/2006 | Cyr et al. | 455/552.1 |
| 7,237,260 B2 * | 6/2007 | Yu et al. | 726/11 |
| 7,317,717 B2 * | 1/2008 | Pankajakshan et al. | 370/352 |
| 7,447,804 B2 * | 11/2008 | Koo | 709/249 |
| 7,450,564 B2 * | 11/2008 | Han | 370/352 |
| 7,508,819 B2 * | 3/2009 | Kobayashi et al. | 370/352 |
| 2005/0125540 A1 | 6/2005 | Szu et al. | |
| 2006/0053447 A1 | 3/2006 | Krzyzanowski et al. | |
| 2006/0165110 A1 * | 7/2006 | Magendanz et al. | 370/419 |
| 2007/0019631 A1 * | 1/2007 | Jang | 370/352 |

OTHER PUBLICATIONS

International Search Report and Written Opinion, 7 pages.
"Universal Plug and Play Device Architecture," version 1.0, Jun. 8, 2000, downloaded on Dec. 28, 2006 from http://www.upnp.org/download/UPnPDA10_20000613.htm, pp. 1-52.

* cited by examiner

Primary Examiner—Moustafa M Meky
(74) Attorney, Agent, or Firm—Patent Law Group LLP; David C. Hsia

(57) ABSTRACT

A first device in a first local area network (LAN) searches for a first Universal Plug and Play (UPnP) enabled router with a first public network address. If found, the first device obtains the first public network address of the first router and configures a first mapping table of the first router to associate several ports number to the first device. These actions may be repeated by a second device in a second LAN for a second UPnP enabled router with a second public network address and several ports number. The two devices then connect through a secondary communication channel (e.g., a telephone network) to exchange networking information. The two devices then use the networking information to establish a computer network connection over a public computer network that couples the first and the second LANs for point-to-point communication.

14 Claims, 5 Drawing Sheets

POINT-TO-POINT COMMUNICATION USING UPNP PROTOCOL

CROSS REFERENCE TO RELATED APPLICATIONS

This application is related to U.S. application Ser. No. 11/280,688 entitled "Using PSTN to Communicate IP Addresses for Point-to-Point Text, Voice, Video, or Data Communication," which is commonly assigned and incorporated herein by reference.

This application is also related to (1) U.S. application Ser. No. 11/618,738, entitled "Network Communication Equipment With PPPoE Bridging Function,", (2) U.S. application Ser. No. 11/618,739, entitled "Determining Pairings of Telephone Numbers and IP Addresses from Caching and Peer-to-Peer Lookup," (3) U.S. application Ser. No. 11/618,740, entitled "Regional Service by Phone," and (4) U.S. application Ser. No. 11/618,741, entitled "Using Second Channel to Communicate IP Address for Point-to-Point Text, Voice, Video, or Data communication," which are concurrently filed, commonly assigned, and incorporated herein by reference.

FIELD OF INVENTION

This invention relates to point-to-point communication over the Internet, and more specifically to Internet-based telephony and teleconferencing.

DESCRIPTION OF RELATED ART

FIG. 1 illustrates a conventional Internet Protocol (IP) communication system 100 that uses a centralized directory 102 to establish a connection between IP devices 104 and 106 over a public computer network 108 (e.g., the Internet). Centralized directory 102 associates static usernames and identities with IP addresses that are likely to change. A change in IP address can occur when a user relocates or reconnects to a network with a dynamic IP address. Centralized directory 102 logs each username and IP address and keeps track of whether users are online or not. When a first user at IP device 104 wishes to communicate with a second user at IP device 106, the first user requests the IP address of the second user from centralized directory 102 and then uses the IP address to establish a connection with the second user over public computer network 108.

Centralized directories become costly when the user base scales into the millions. Furthermore, many traditional telephone users are more comfortable with dialing telephone numbers than login into computers. Thus, what is needed is an IP communication system without a centralized directory that is more familiar to traditional telephone users.

BRIEF DESCRIPTION OF THE DRAWINGS

Use of the same reference numbers in different figures indicates similar or identical elements.

SUMMARY

In one embodiment of the invention, a first device searches in a first local area network (LAN) for a first Universal Plug and Play (UPnP) enabled router with a first public network address. The first LAN is coupled by a public computer network, such as the Internet, to a second LAN. Once the first UPnP enabled router is found, the first device obtains the first public network address of the first UPnP enabled router and configures a first mapping table of the first UPnP enabled router to associate several ports to the first device.

In one embodiment, a second device searches in the second LAN for a second UPnP enabled router with a second public network address. Once the second UPnP enabled router is found, the second device obtains a second public network address of the second UPnP enabled router and configures a second mapping table of the second UPnP enabled router to associate several ports to the second device.

In one embodiment, the first and the second devices connect over a secondary channel of communication (e.g., a telephone network) to exchange at least one of the first and the second public network addresses and one of the port numbers for the at least one of the first and the second public network addresses. The first and the second devices then use the exchanged information to establish a computer network connection over the public computer network. The network connection may be used for text, voice, video, or data communication.

DETAILED DESCRIPTION

Figure 1:
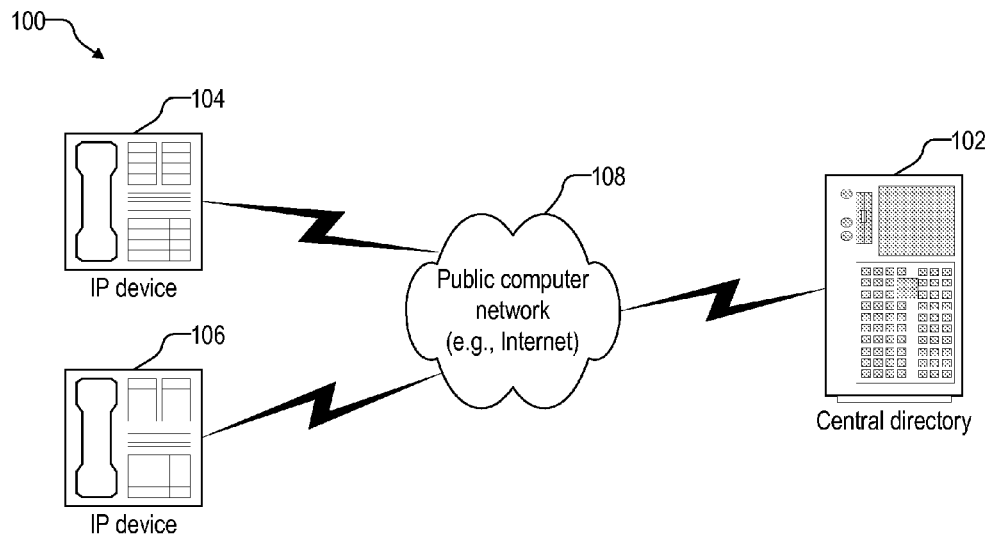
FIG. 1 illustrates a conventional system for communication over a public computer network.
Figure 2:
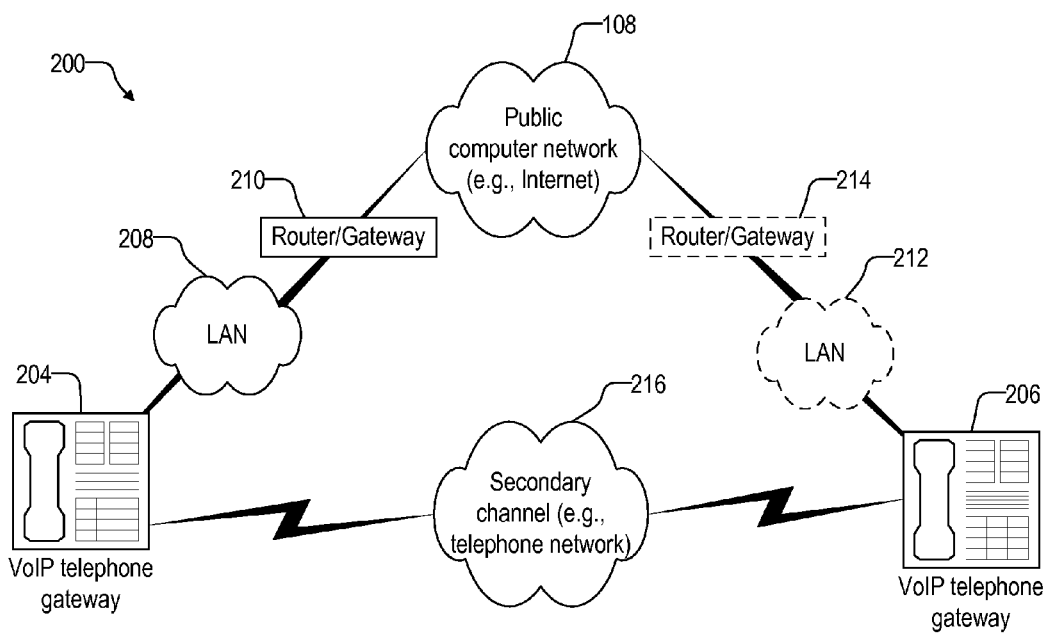
FIG. 2 illustrates a system for using a public switched telephone network (PSTN) to setup communication over a public computer network in one embodiment of the invention.

FIG. 2 illustrates an IP communication system 200 without a centralized directory in one embodiment of the invention. IP communication system 200 includes VoIP telephone gateway devices 204 and 206 connected to public computer network 108 (e.g., the Internet). VoIP telephone gateway 204 is connected to public computer network 108 through a local area network (LAN) 208 having a Universal Plug and Play (UPnP) enabled router/gateway 210. VoIP telephone gateway 206 may be connected to public computer network 108 through a LAN 212 having an UPnP enabled router/gateway 214. VoIP telephone gateways 204 and 206 are also connected to a secondary communication channel 216 (e.g., a public switched telephone network). VoIP telephone gateways 204 and 206 use public switched telephone network (PSTN) 216 to communicate at least one IP address and at least one port number for establishing a computer network connection over public computer network 108. Instead of being a PSTN, secondary communication channel 216 can also be a mobile telephone network, a conventional VoIP communication channel, a digital video channel, a satellite communication channel, or a regional wireless data channel as described in U.S. patent application Ser. No. 11/618,741.

Figure 3:
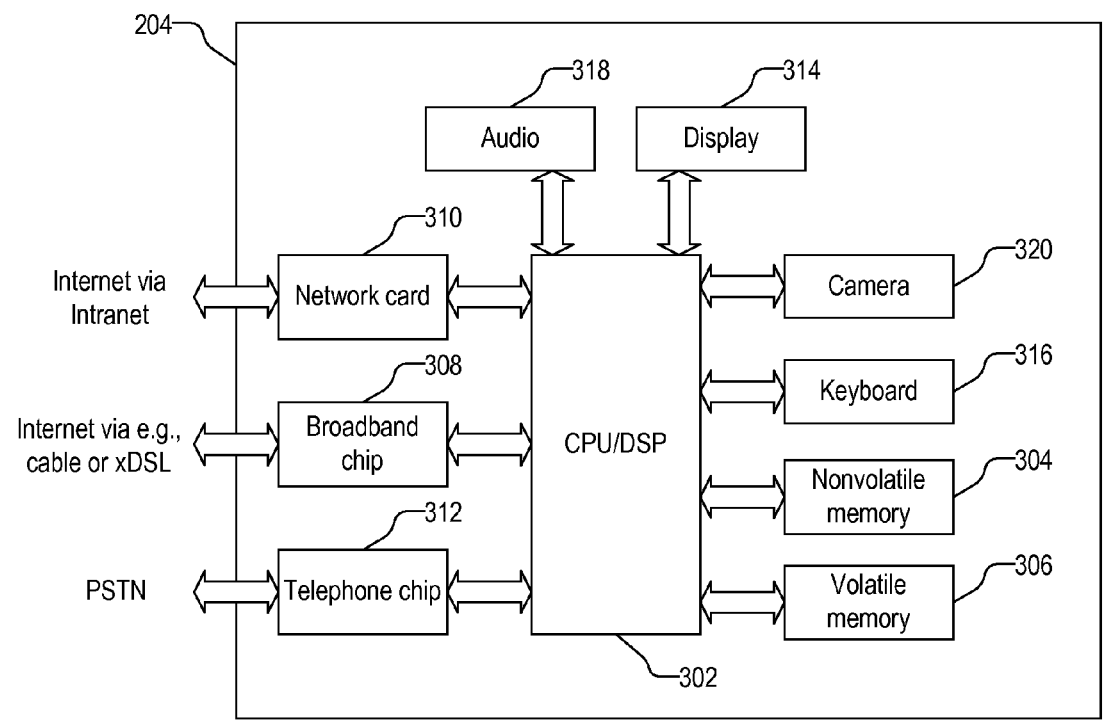
FIG. 3 illustrates a Voice over IP (VoIP) telephone gateway device used in the system of FIG. 2 in one embodiment of the invention.

FIG. 3 illustrates VoIP telephone gateway 204 in one embodiment of the invention. VoIP telephone gateway 204 has the form factor of a telephone or a videophone and is an UPnP control point for UPnP enabled devices. VoIP telephone gateway 204 includes a central processing unit (CPU)

or digital signal processor (DSP) 302 that executes IP communication software loaded from nonvolatile memory 304 to volatile memory 306. CPU 302 uses a network card 310 to access public computer network 108 through LAN 208. Optionally, CPU 302 uses a broadband chip 308 to directly access public computer network 108 by cable or xDSL (digital subscriber line). CPU 302 uses a telephone chip 312 to access PSTN 216. Telephone chip 312 includes a modem for generating and receiving signals over PSTN 216. For text, voice, and video communications, CPU 302 may be further connected to peripherals including a display 314, a keypad or keyboard 316, microphone and speaker 318, and a camera 320. VoIP telephone gateway 206 may be similarly implemented as VoIP telephone gateway 204.

Figure 4:
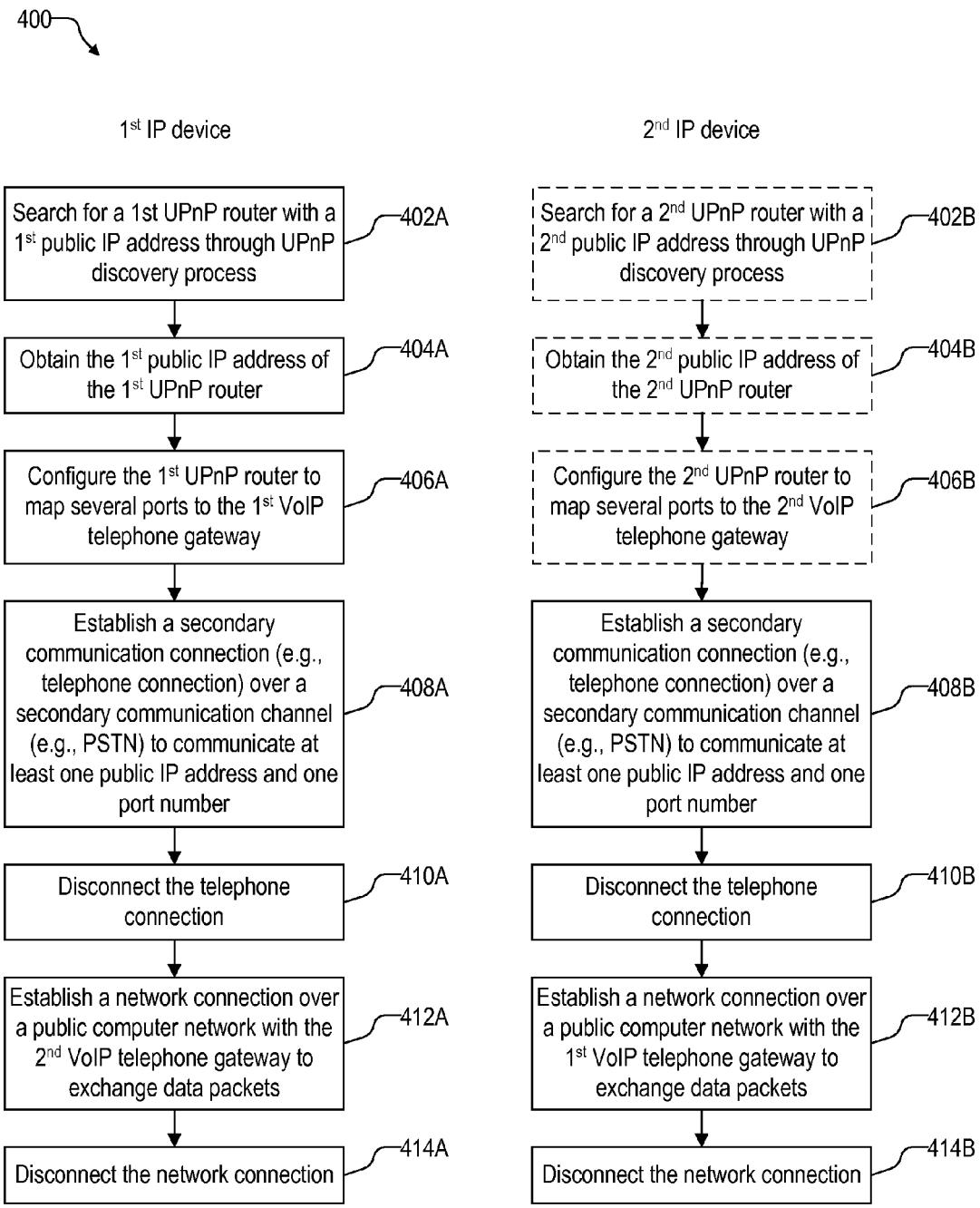
FIG. 4 is a flowchart of a method for using the PSTN to setup communication over a public computer network in embodiments of the invention.

FIG. 4 illustrates a method 400 for parties to communicate using IP communication system 200 in one embodiment of the invention. The actions of VoIP telephone gateway 204 are shown in the left while the actions of VoIp telephone gateway 206 are shown in the right.

Referring first to the actions of VoIP telephone gateway 204, in step 402A, VoIP telephone gateway 204 searches LAN 208 for an UPnP enabled router/gateway (e.g., router 210) that has a public network address on public computer network 108. There are two ways VoIP telephone gateway 204 can do this. VoIP telephone gateway 204 can learn of router 210 because router 210 responded to discovery messages from VoIP telephone gateway 204 searching for an UPnP enabled router/gateway. VoIP telephone gateway 204 can also learn of router 210 because router 210 sent notify messages advertising itself and its services.

In step 404A, VoIP telephone gateway 204 obtains the public network address of router 210.

In step 406A, VoIP telephone gateway 204 configures the mapping table of router 210 to associate one or more ports number to the IP address of VoIP telephone gateway 204.

In step 408A, VoIP telephone gateway 204 establishes a secondary communication connection (e.g., a telephone connection) with VoIP telephone gateway 206 over secondary communication channel 216 (e.g., PSTN 216) to exchange information necessary to establish a network connection over public computer network 108. VoIP telephone gateway 204 may dial a telephone number associated to VoIP telephone gateway 206 or vice versa depending on which device initiates the communication (i.e., which device is the caller and which device is the recipient).

The information exchanged can be different depending on the embodiment. In one embodiment, VoIP telephone gateway 204 transmits its first port number and the public network address of router 210 to VoIP telephone gateway 206, and receives the first port number and the public network address associated to VoIP telephone gateway 206. In another embodiment, VoIP telephone gateway 204 only transmits its first port number and the public network address of router 210 to VoIP telephone gateway 206. In yet another embodiment, VoIP telephone gateway 204 only receives the first port number and the public network address associated to VoIP telephone gateway 206.

The method of communication between VoIP telephone gateways 204 and 206 over PSTN 216 can be different depending on the embodiment. In one embodiment, VoIP telephone gateway 204 sends and receives port numbers and public IP addresses as a series of standard touch-tones. The touch-tones can include a redundancy check (e.g., a checksum) so VoIP telephone gateways 204 and 206 can verify the accuracy of the touch-tones and request retransmission when there is an error. In another embodiment, VoIP telephone gateway 204 dials the telephone number associated to VoIP telephone gateway 206 and includes its associated port number and public IP address in the touch-tones used to dial out over PSTN 216. PSTN 216 uses the recipient's telephone number to ring VoIP telephone gateway 206 and then transmits a modem message with the port number and the public IP address associated to VoIP telephone gateway 204. The modem message can be transmitted using frequency-shift keying (FSK) or dual-tone multifrequency (DTMF) signaling between telephone rings. In the same manner, VoIP telephone gateway 204 can receive the port number and the public IP address associated to VoIP telephone gateway 206.

In step 410A, VoIP telephone gateway 204 disconnects the telephone connection.

In step 412A, VoIP telephone gateway 204 establishes a computer network connection with VoIP telephone gateway 206 over public computer network 108 to exchange data packets. Specifically, if VoIP telephone gateway 204 received the first port number and the public network address associated to VoIP telephone gateway 206 in step 408A, it can start sending data packets to VoIP telephone gateway 206. If VoIP telephone gateway 204 did not send its associated port number and public network address to VoIP telephone gateway 206 in step 408A, it includes them now in a data packet to VoIP telephone gateway 206. If VoIP telephone gateway 204 did not receive the associated port number and public network address of VoIP telephone gateway 206 in step 408A, VoIP telephone gateway 204 waits to receive a data packet from VoIP telephone gateway 206 that includes the first associated port number and the public network address of VoIP telephone gateway 206.

In step 414A, VoIP telephone gateway 204 disconnects the computer network connection.

Referring now to the actions of VoIP telephone gateway 206, in step 402B, VoIP telephone gateway 204 searches in LAN 212 for an UPnP enabled router/gateway (e.g., router 214) that has a public network address on public computer network 108. Step 402A is similar to step 402A described above.

In step 404B, VoIP telephone gateway 206 obtains the public network address of router 214.

In step 406B, VoIP telephone gateway 206 configures the mapping table of router 214 to associate several port numbers to VoIP telephone gateway 206. Note that in one embodiment, VoIP telephone gateway 206 skips steps 402B, 404B, and 406B if it has a public network address because it is directly connected to public computer network 108.

In step 408B, VoIP telephone gateway 206 establishes a secondary communication connection (e.g., a telephone connection) with VoIP telephone gateway 204 over secondary communication channel 216 (e.g., PSTN 216) to exchange information necessary to establish a network connection over public computer network 108. Step 408B is similar to step 408A described above.

In step 410B, VoIP telephone gateway 206 disconnects the telephone connection.

In step 412B, VoIP telephone gateway 206 establishes a network communication with VoIP telephone gateway 206 over public computer network 108 to exchange data packets. Step 412B is similar to step 412A described above.

In step 414B, VoIP telephone gateway 206 disconnects the network connection.

Figure 5:
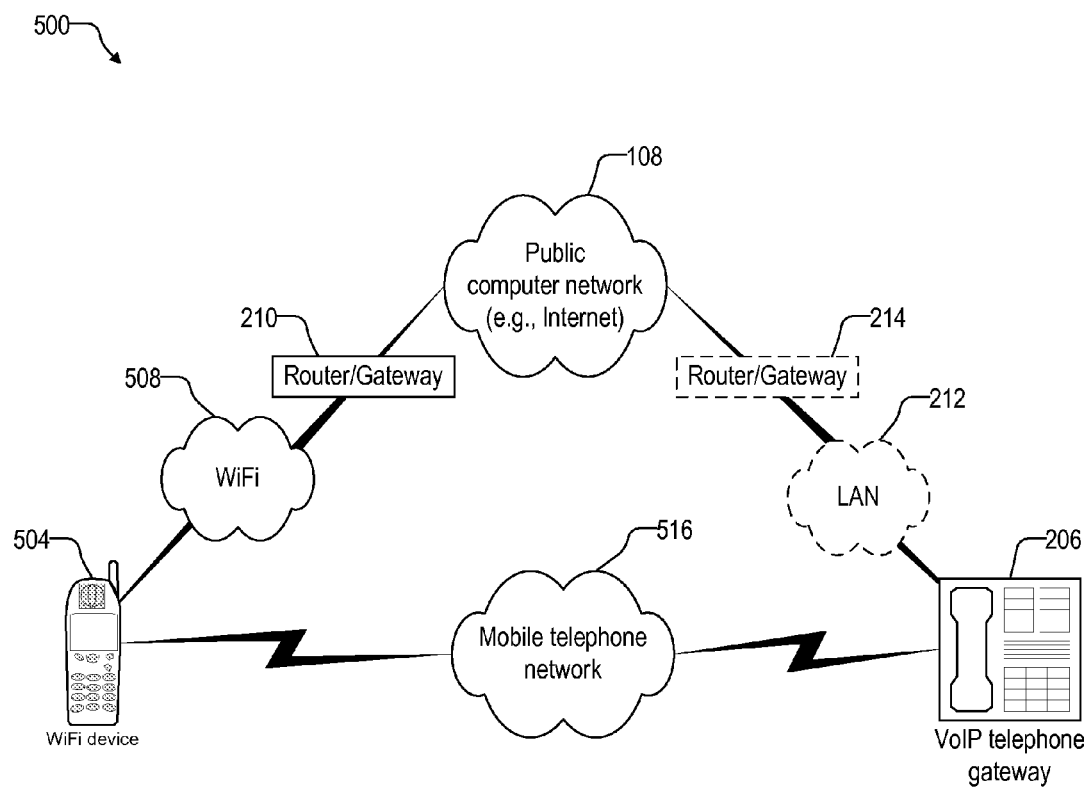
FIG. 5 illustrates a system for using a mobile telephone network to setup communication over a public computer network in one embodiment of the invention.

FIG. 5 illustrates an IP communication system 500 without a centralized directory in another embodiment of the invention. IP communication system 500 includes a Wi-Fi device 504 and VoIP telephone gateway 206 connected to public computer network 108 (e.g., the Internet). In one embodiment, Wi-Fi device 504 is a Wi-Fi enabled mobile telephone. Wi-Fi device 504 is connected to public computer network 108 through a wireless LAN 508 (e.g., a Wi-Fi network) having UPnP enabled router/gateway 210. VoIP telephone gateway 206 may be connected to public computer network 108 through LAN 212 having UPnP enabled router/gateway 214. Devices 504 and 206 are also connected to a mobile telephone network 516, such as a GSM or CDMA mobile telephone network. Devices 504 and 206 use mobile telephone network 516 to communicate at least one IP address and one port number for establishing a network connection over public computer network 108.

Figure 6:
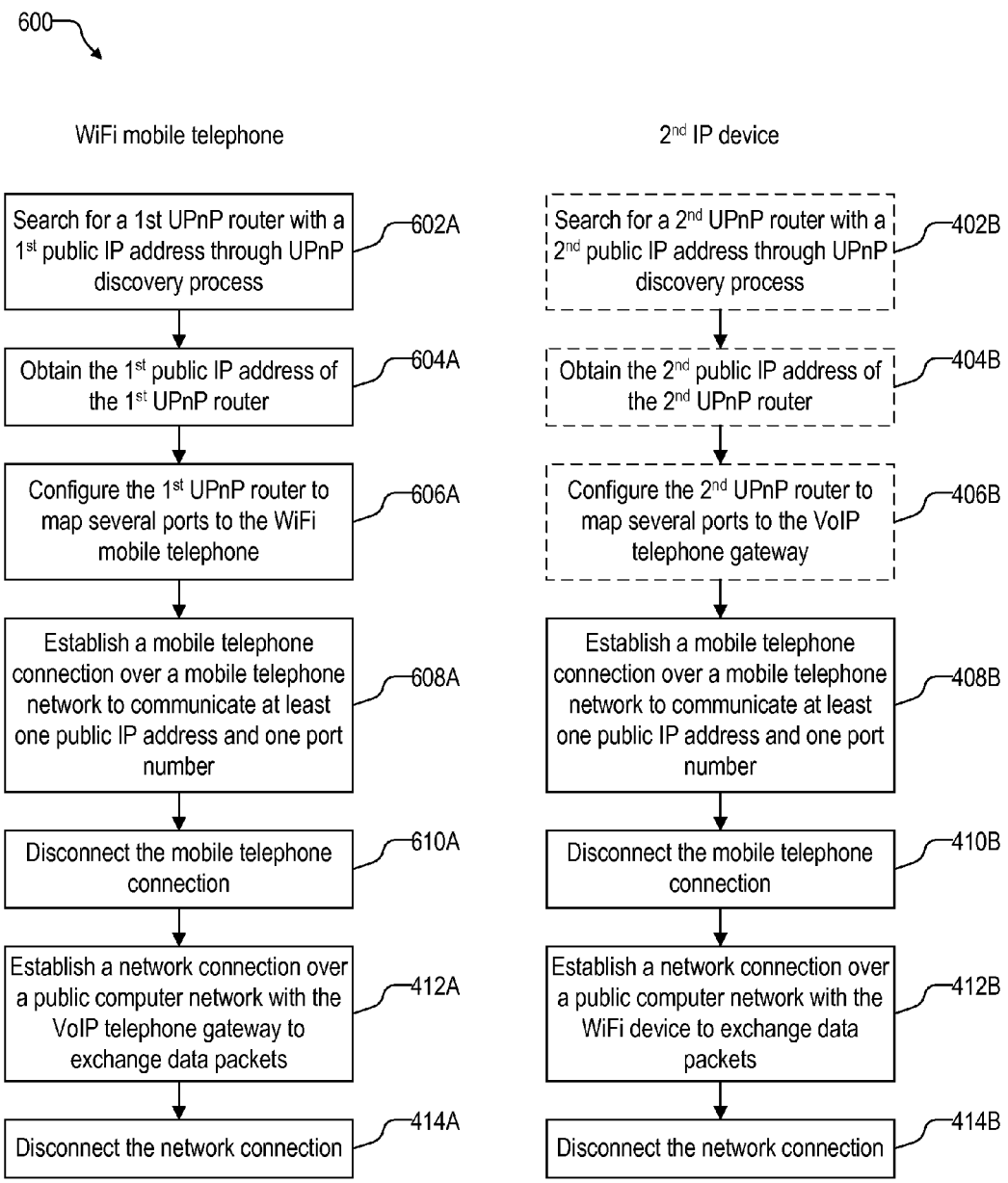
FIG. 6 is a flowchart of a method for using the mobile telephone network to setup communication over a public computer network in embodiments of the invention.

FIG. 6 illustrates a method 600 for parties to communicate using IP communication system 500 in one embodiment of the invention. The actions of Wi-Fi device 504 are shown in the left while the actions of VoIP telephone gateway 206 are shown in the right.

Referring first to the actions of Wi-Fi device 504, in step 602A, Wi-Fi device 504 searches Wi-Fi network 508 for an UPnP enabled router/gateway (e.g., router 210) that has a public network address on public computer network 108. Step 602A is similar to step 402A described above.

In step 604A, Wi-Fi device 504 obtains the public network address of router 210.

In step 606A, Wi-Fi device 504 configures the mapping table of router 210 to associate several ports number to Wi-Fi device 504.

In step 608A, Wi-Fi device 504 establishes a mobile telephone connection with VoIP telephone gateway 206 over mobile telephone network 516 to exchange information necessary to establish a network connection over public computer network 108. Step 608A is similar to step 408A described above.

In step 610A, Wi-Fi device 504 disconnects the mobile telephone connection.

In step 612A, Wi-Fi device 504 establishes a computer network connection with VoIP telephone gateway 206 over public computer network 108 to exchange data packets. Step 612A is similar to step 412A described above.

In step 614A, Wi-Fi device 504 disconnects the computer network connection.

In method 600, VoIP telephone gateway 206 performs the similar actions as it did in method 400 described above.

Various other adaptations and combinations of features of the embodiments disclosed are within the scope of the invention. Numerous embodiments are encompassed by the following claims.

What is claimed is:

1. A method for a first device in a first local area network (LAN) to communicate with a second device in a second LAN over a public computer network that couples the first and the second LANs, the method comprising the first device:
   discovering a first Universal Plug and Play (UPnP) enabled router in the first LAN, the first UPnP enabled router having a first public network address;
   configuring a mapping table of the first UPnP enabled router to associate at least a first port number to the first device;
   establishing a secondary communication connection to the second device over a secondary communication channel to perform at least one of following:
      sending to the second device the first public network address and at least the first port number; and
      receiving from the second device a second public network address and at least a second port number associated to the second device; and
   establishing a network connection to the second device over the public computer network using the second public network address and at least the second port number to exchange data packets with the second devices.

2. The method of claim 1, wherein the first LAN is an UPnP LAN and the first device is a control point in the UPnP LAN.

3. The method of claim 2, wherein said discovering a first UPnP enabled router comprises one of:
   sending a discovery message to search for the first UPnP enabled router and learning of the first UPnP enabled router because the first UPnP enabled router responded to the discovery message; and
   learning of the first UPnP enabled router because the first UPnP enabled router sent a notify message advertising itself.

4. The method of claim 3, wherein the second public network address is that of a second UPnP enabled router in the second LAN.

5. The method of claim 1, wherein the first LAN is a wired LAN and the secondary communication channel is a public switched telephone network (PSTN).

6. The method of claim 1, wherein the first LAN is a wireless LAN and the secondary communication channel is a mobile phone network.

7. The method of claim 1, wherein the secondary communication channel is selected from the group consisting of a public switched telephone network, a mobile telephone network, a conventional VoIP communication network, a digital video channel, a satellite communication channel, and a regional wireless data channel.

8. A non-transitory computer-readable storage medium encoded with executable instructions for execution by a processor of a first device in a first local area network (LAN) to communicate with a second device in a second LAN over a public computer network that couples the first and the second LANs, the instructions for the processor of the first device comprising:
   discovering a first Universal Plug and Play (UPnP) enabled router in the first LAN with a public network address;
   configuring a mapping table of the first UPnP enabled router to associate at least a first port number to the first device;
   establishing a secondary communication connection to the second device over a secondary communication channel to perform at least one of following:
      sending to the second device the first public network address and at least the first port number; and
      receiving from the second device a second public network address and at least a second port number associated to the second device; and
   establishing a network connection to the second device over the public computer network using the second public network address and at least the second port number to exchange data packets with the second devices.

9. The non-transitory computer-readable storage medium of claim 8, wherein the first LAN is an UPnP LAN and the first device is a control point in the UPnP LAN.

10. The non-transitory computer-readable storage medium of claim 9, wherein said discovering a first UPnP enabled router comprises one of:
   sending a discovery message to search for the first UPnP enabled router and learning of the first UPnP enabled router because the first UPnP enabled router responded to the discovery message;

and learning of the first UPnP enabled router because the first UPnP enabled router sent a notify message advertising itself.

11. The non-transitory computer-readable storage medium of claim 10, wherein the second public network address is that of a second UPnP enabled router in the second LAN.

12. The non-transitory computer-readable storage medium of claim 8, wherein the first LAN is a wired LAN and the secondary communication channel is a public switched telephone network (PSTN).

13. The non-transitory computer-readable storage medium of claim 8, wherein the first LAN is a wireless LAN and the secondary communication channel is a mobile phone network.

14. The non-transitory computer-readable storage medium of claim 8, wherein the secondary communication channel is selected from the group consisting of a public switched telephone network, a mobile telephone network, a conventional VoIP communication network, a digital video channel, a satellite communication channel, and a regional wireless data channel.

* * * * *